United States Patent
Agarwal et al.

(10) Patent No.: US 7,675,418 B2
(45) Date of Patent: Mar. 9, 2010

(54) SYNCHRONOUS COMMAND MODEL FOR RFID-ENABLING APPLICATIONS

(75) Inventors: Abhishek Agarwal, Hyderabad (IN); Anush Kumar, Seattle, WA (US); Balasubramanian Sriram, Sammamish, WA (US); Mohamed Fakrudeen Ali Ahmed, Coimbatore (IN); Janaki Ram Goteti, Hyderabad (IN); Jayaraman Kalyana Sundaram, Gachibowli (IN); Kalyan Chakravarthy Sonnathi, Hyderabad (IN); Ramachandran Venkatesh, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 846 days.

(21) Appl. No.: 11/460,830

(22) Filed: Jul. 28, 2006

(65) Prior Publication Data

US 2008/0001712 A1     Jan. 3, 2008

(51) Int. Cl.
*G08B 13/14* (2006.01)
(52) U.S. Cl. .................................. 340/572.1
(58) Field of Classification Search ........... 340/10.1, 340/572.1–572.9; 709/249, 250, 248; 370/310
See application file for complete search history.

(56) References Cited

U.S. PATENT DOCUMENTS

| 5,650,768 | A | 7/1997 | Eswaran |
| 5,910,776 | A | 6/1999 | Black |
| 6,405,261 | B1 | 6/2002 | Gaucher |
| 6,631,363 | B1 * | 10/2003 | Brown et al. ............. 707/1 |
| 6,677,852 | B1 | 1/2004 | Landt |
| 6,732,923 | B2 | 5/2004 | Otto |
| 6,784,802 | B1 | 8/2004 | Stanescu |
| 6,908,034 | B2 | 6/2005 | Alleshouse |
| 6,943,683 | B2 | 9/2005 | Perret |
| 7,155,302 | B2 | 12/2006 | Muto et al. |
| 7,204,409 | B2 | 4/2007 | Kumar et al. |
| 7,267,275 | B2 | 9/2007 | Cox et al. |
| 7,382,260 | B2 * | 6/2008 | Agarwal et al. .......... 340/572.1 |
| 7,484,664 | B2 * | 2/2009 | Shafer ....................... 235/451 |
| 2002/0059471 | A1 | 5/2002 | Sanghvi et al. |
| 2002/0070865 | A1 | 6/2002 | Lancos et al. |
| 2002/0170952 | A1 | 11/2002 | Alsafadi et al. |
| 2003/0135576 | A1 | 7/2003 | Bodin |
| 2003/0144926 | A1 | 7/2003 | Bodin et al. |
| 2003/0225928 | A1 | 12/2003 | Paul |
| 2003/0227392 | A1 | 12/2003 | Ebert et al. |

(Continued)

FOREIGN PATENT DOCUMENTS

| EP | 11632893 | 3/2006 |
| WO | 03102845 | 12/2003 |
| WO | 2005078633 | 8/2005 |

OTHER PUBLICATIONS

European Search Report dated Feb. 6, 2006, mailed Feb. 6, 2006 for EP Appln. Serial No. 05107826, 7 pages.

(Continued)

*Primary Examiner*—Phung Nguyen
(74) *Attorney, Agent, or Firm*—Turocy & Watson, LLP

(57) ABSTRACT

The claimed subject matter provides a system and/or a method that facilitates providing communication channels within a radio frequency identification (RFID) infrastructure. A radio frequency identification (RFID) network can include at least one device that can receive data from a tag. A mixed mode component can employ a synchronous command and an asynchronous event processing with the device.

19 Claims, 12 Drawing Sheets

U.S. PATENT DOCUMENTS

| | | | |
|---|---|---|---|
| 2004/0046642 A1* | 3/2004 | Becker et al. | 340/10.32 |
| 2004/0070491 A1 | 4/2004 | Huang et al. | |
| 2004/0111335 A1 | 6/2004 | Black et al. | |
| 2004/0193641 A1 | 9/2004 | Lin | |
| 2004/0215667 A1 | 10/2004 | Taylor et al. | |
| 2005/0062603 A1 | 3/2005 | Fuerst et al. | |
| 2005/0092825 A1 | 5/2005 | Cox et al. | |
| 2005/0150952 A1 | 7/2005 | Chung | |
| 2005/0150953 A1 | 7/2005 | Alleshouse | |
| 2005/0237194 A1 | 10/2005 | VoBa | |
| 2006/0043165 A1 | 3/2006 | Kumar et al. | |
| 2006/0047464 A1 | 3/2006 | Kumar et al. | |
| 2006/0047545 A1 | 3/2006 | Kumar et al. | |
| 2006/0047646 A1 | 3/2006 | Maluf et al. | |
| 2006/0047787 A1 | 3/2006 | Agarwal et al. | |
| 2006/0047789 A1 | 3/2006 | Kumar et al. | |
| 2006/0053234 A1 | 3/2006 | Kumar et al. | |
| 2006/0055508 A1 | 3/2006 | Kumar et al. | |
| 2006/0058987 A1 | 3/2006 | Kumar et al. | |
| 2007/0035396 A1* | 2/2007 | Chand et al. | 340/572.1 |

OTHER PUBLICATIONS

European Search Report dated Oct. 4, 2005, mailed Apr. 11, 2006 for EP Appln. Serial No. 05108005, 9 pages.

European Search Report dated Oct. 2, 2005, mailed Feb. 10, 2006 for EP Appln. Serial No. 05107796, 6 pages.

IBM."alphaWorks: RFID Device Development Kit: Overview" http://www/alphaworks.ibm.com/tech/rfiddevice last viewed Nov. 7, 2005, 1 page.

Alien "ALR-9800 Enterprise RFID Reader" http://www.alientechnology.com/docs/AT_DS_9800v3_WEB.pdf last viewed Nov. 7, 2005, 4 pages.

Tsetsos, et al. "Commercial Wireless Sensor Networks: Technical and Business Issues" Proceedings of the Second Annual Conference on Wireless On-Demand Network Systems and Services (Jan. 19-21, 2005) 8 pages.

Branch, et al. "Sentire: A Framework for Building Middleware for Sensor and Actuator Networks" Proceedings of the Third International Conference on Pervasive Computing and Communications Workshops (Mar. 8, 2005) pp. 396-400.

Harrison, et al. "Information Management in the Product Lifecycle-the Role Networked RFID" Proceedings of the Second IEEE International Conference (Jun. 24, 2004) pp. 507-512.

Bornhovd, et al. "Integrating Smart Items with Business Processes an Experience Report" Proceedings of the Thirty-Eighth Hawaii International Conference on System Science (Jan. 3, 2005) 8 pages.

Ganesh, et al. "Web Services and Multi-Channel Integration: A Proposed Framework" Proceedings of the IEEE International Conference on Web Services (Jul. 6, 2004) 8 pages.

Ortiz. "An Introduction to Java Card Technology-Part1" http://developers.sun.com/techtopics/mobility/javacard/articles/javacard1/> last viewed Dec. 19, 2005, 14 pages.

Chen. "Understanding Java Card 2.0" URL.com//javaworld/jw-03-javadev_p.html> last viewed Dec. 19, 2005, 12 pages.

Annonymous. "The Sun Global RFID Network Vision: Connecting Business at the Edge of Network" http://www.sun.com/software/solutions/rfid/Sun_RFIS_Vision_rla.pdf Jul. 2004.

European Search Report dated Mar. 9, 2006, mailed Mar. 27, 2006 for European Patent Application Serial No. EP05107794, 5 pages.

European Search Report dated Feb. 7, 2006, mailed Feb. 7, 2006 for European Patent Application Serial No. EP05108001, 7 pages.

European Search Report dated May 11, 2006, mailed May 12, 2006 for European Patent Application Serial No. EP05107744, 7 pages.

International Search Report dated and mailed Jul. 27, 2007 for PCT Application Serial No. PCT 2007/004005, 6 pages.

Floerkemier, et al. "PML Core Specification 1.0" Sep. 13, 2003, Auto-ID Center, Version 1.0, 48 pages.

* cited by examiner

SYNCHRONOUS COMMAND MODEL FOR RFID-ENABLING APPLICATIONS

CROSS REFERENCE TO RELATED APPLICATION(S)

This application claims the benefit of India Patent Application Serial No. 1426/DEL/2006 filed on Jun. 15, 2006, entitled "SYNCHRONOUS COMMAND EXECUTION MODEL FOR RFID-ENABLING APPLICATIONS." The entirety of which application is incorporated herein by reference.

BACKGROUND

Many retail, manufacture, and distribution establishments are applying different and innovative operating methods to increase efficiency. These establishments can monitor store inventory to facilitate optimizing supply and demand relating to consumers. One aspect of maximizing profit hinges on properly stocking inventory such that replenishment occurs in conjunction with exhaustion of goods and/or products. For example, a retailer selling a computer and/or a VCR, must stock the computer in relation to its consumer sales, and the VCR in relation to its consumer sales. Thus, if the computer is in higher demand (e.g. more units sold) than the VCR, the retailer can stock the computer more frequently in order to optimize supply and demand, and in turn, profit. Monitoring inventory and associated sales can be a complex task, wherein product activity is comparable to a black box since inner workings are unknown; yet monitoring products is a crucial element in inventory/product efficiency.

Automatic identification and data capture (AIDC) technology, and specifically, Radio Frequency Identification (RFID) has been developed based at least upon the need to cure deficiencies of typical monitoring systems and/or methodologies (e.g., barcode readers, barcodes, and/or UPCs). RFID is a technique of remotely storing and retrieving data utilizing RFID tags. Since RFID systems are based upon radio frequency and associated signals, numerous benefits and/or advantages precede traditional techniques in monitoring products. RFID technology does not require a line of sight in order to monitor products and/or receive signals from RFID tags. Thus, no manual scan is necessary wherein the scanner is required to be in close proximity of the target (e.g., product). Yet, range is limited in RFID based upon radio frequency, RFID tag size, and associated power source. Additionally, RFID systems allow multiple reads within seconds providing quick scans and identification. In other words, an RFID system allows a plurality of tags to be read and/or identified when the tags are within a range of an RFID reader. The capability of multiple reads in an RFID system is complimented with the ability of providing informational tags that contain a unique identification code to each individual product.

Moreover, RFID systems and/or methodologies provide real-time data associated to a tagged item. Real-time data streams allow a retailer, distributor, and/or manufacturer the ability to monitor inventory and/or products with precision. Utilizing RFID can further facilitate supplying products on a front-end distribution (e.g., retailer to consumer) and a back-end distribution (e.g. distributor/manufacturer to retailer). Distributors and/or manufacturers can monitor shipments of goods, quality, amount, shipping time, etc. In addition, retailers can track the amount of inventory received, location of such inventory, quality, shelf life, etc. The described benefits demonstrate the flexibility of RFID technology to function across multiple domains such as, front-end supply, back-end supply, distribution chains, manufacturing, retail, automation, etc.

An RFID system consists of at least an RFID tag and an RFID transceiver. The RFID tag can contain an antenna that provides reception and/or transmission to radio frequency queries from the RFID transceiver. The RFID tag can be a small object, such as, for example, an adhesive sticker, a flexible label and integrated chip, etc. There are typically four different frequencies the RFID tags utilize: low frequency tags (between about 125 to 134 kilohertz), high frequency tags (about 13.56 megahertz), UHF tags (about 868 to 956 megahertz) and Microwave tags (about 2.45 gigahertz).

In general, an RFID system can include multiple components: tags, tag readers (e.g. tag transceivers), tag writers, tag-programming stations, circulation readers, sorting equipment, tag inventory wands, etc. Moreover, various makes, models, types, and/or applications can be associated with respective components (e.g., tag, tag readers, tag programming stations, circulation readers, sorting equipment, tag inventory wands, . . . ), which can complicate compatibility within the RFID system and with other RFID systems. In view of the above, there is a need to provide a uniform way to incorporate various makes, models, types, and/or applications into disparate RFID systems.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate employing a synchronous mode and an asynchronous mode in relation to an application and event processing within an RFID infrastructure. A mixed mode component can provide a synchronous command and an asynchronous event processing to a device within an RFID network. The synchronous command can be a request-response pattern utilizing a designated communication channel between an application and/or process and the device. Moreover, the channel for the synchronous command can be opened and closed solely to allow the response and the request to be implemented. The asynchronous event processing can utilize a communication channel between an RFID process and the device such that the RFID process can receive data without polling the device to do so. It is to be appreciated that the mixed mode component can simultaneously employ the synchronous command and the asynchronous event processing to the same device. In particular, one usage scenario can be executing a synchronous command in response to an asynchronous event. For example, a light sensor trip event can be initiated which can be an asynchronous event, wherein upon a particular light sensor being tripped, a synchronous command can be executed. Upon the tripping of the light sensor, and initiation of the light sensor trip event, an antenna enabled property can be set to true (e.g. the synchronous command that is executed based on the asynchronous event) that turns on the antenna.

The device that receives data from a tag within the RFID network can be, but is not limited to being, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system. Furthermore, the RFID process that can utilize the asynchronous event processing can be related to a particular RFID subsystem (e.g., an RFID server, RFID network, etc.) that is an uber or high-level object that forms together various entities to create a meaningful unit of execution. The RFID process can be an outbound process (e.g. pick, pack, shipping scenario, etc.), a manufacturing process, a shipping process, a receiving process, tracking, data representation, data manipulation, data application, security, etc.

In accordance with one aspect of the claimed subject matter, the mixed mode component can initiate a multi-command exclusive access to the device during the synchronous command. An application can initiate a communication channel to provide a synchronous command, wherein such communication channel can be exclusively accessed solely by the application. By providing exclusive access to the application, interleaving requests from multiple applications can be handled in a way that guarantees atomicity of operations (e.g. exclusive connection access). In accordance with another aspect of the claimed subject matter, an administrative channel can be provided. In accordance with still another aspect of the claimed subject matter, a uniform programming model can be utilized. The programming model for interacting with the device with the following capabilities: 1) hardware agnostic; 2) physical connection agnostic; 3) multi-command exclusive access; and 4) administration channel capability. In other words, the uniform programming model can be device agnostic for hardware to execute synchronous commands and physical connection agnostic to allow an application to receive asynchronous notifications from a device while a synchronous command is performed on the device. Moreover, the uniform programming model can abstract the fact that one physical connection can be re-used for multiple exclusive logical connections (e.g., an asynchronous listener versus a synchronous application). In other aspects of the claimed subject matter, methods are provided that facilitate employing a synchronous mode and an asynchronous mode in relation to an application and event processing within an RFID infrastructure.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
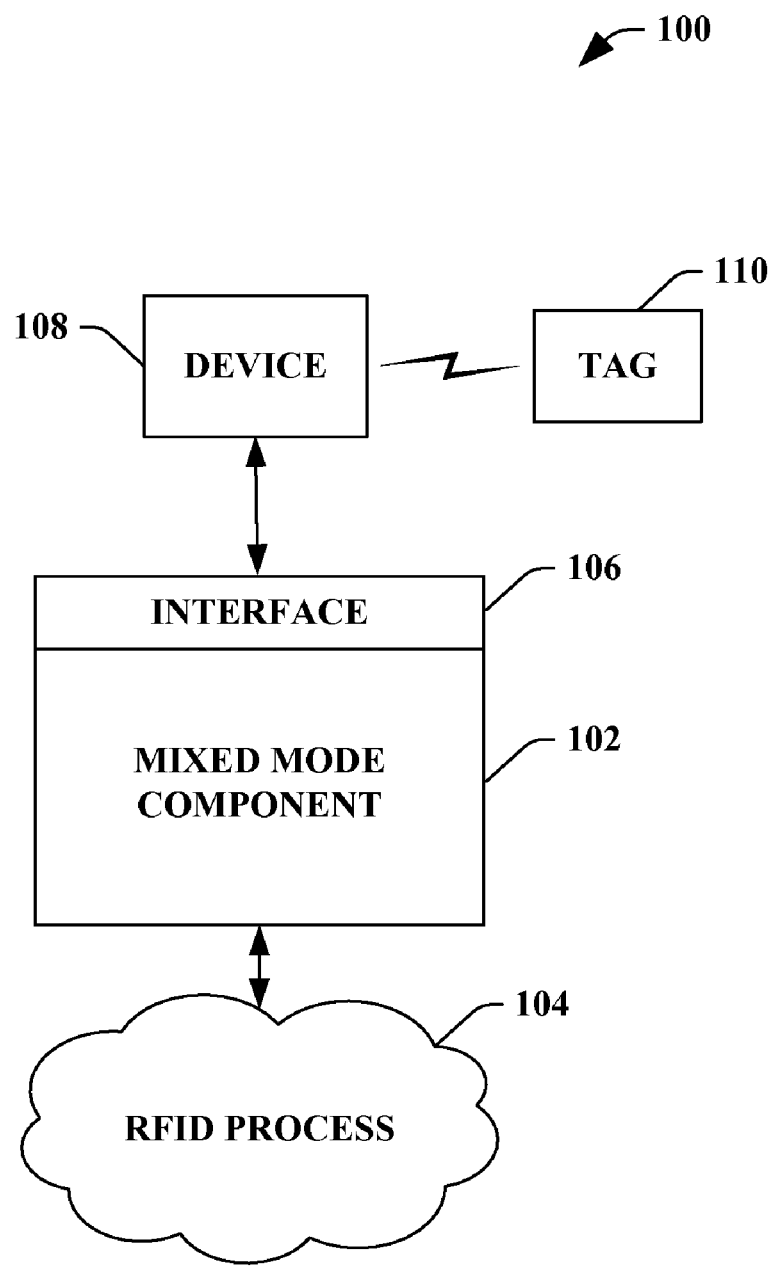
FIG. 1 illustrates a block diagram of an exemplary system that facilitates employing a synchronous mode and an asynchronous mode in relation to an application and event processing within an RFID infrastructure.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "process," "provider," "handler," and the like are intended to refer to a computer-related entity, either hardware, software (e.g. in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates employing a synchronous mode and an asynchronous mode in relation to an application and event processing within an RFID infrastructure. The system 100 can include a mixed mode component 102 that initiates a synchronous command and an asynchronous event processing with a device 108 that can receive data from a tag 110. The mixed mode component 102 allows a synchronous command model and an asynchronous event processing model to be employed in connection with the device 108 and an application (not shown), an RFID process 104, an RFID business process (not shown), etc. It is to be appreciated that the mixed mode component 102 can employ a synchronous mode, an asynchronous mode, and/or any combination thereof simultaneously. In other words, the mixed mode component 102 can simultaneously initiate synchronous commands and asynchronous processing with the device 108.

For example, the synchronous command model can follow a request-response pattern. An application, process, etc. can issue a specific request to the device 108 by utilizing the RFID infrastructure and receive a message after the request is completed. For instance, the following synchronous commands can be implemented by the mixed mode component 102: print tag, decommission tag, read tag, write tag, add read filter, and remove read filter. When utilizing the synchronous commands, such requests can be sent to the device 108 immediately, wherein the application can wait for a response to ensure the request is serviced and/or completed. It is to be appreciated that the mixed mode component 102 can allow an exclusive connection with the device 108 when utilizing the synchronous command. In other words, an application and/or process can own a synchronous connection for a particular interval of time. For example, when the application and/or process issues a command to print the tag 110, another application and/or process is not allowed to issue a command to decommission the tag 110.

In another example, the mixed mode component 102 supports an asynchronous event processing model in connection with the RFID process 104. The RFID process 104 can continuously receive a tag read event based on declared interest for such events during device binding. For instance, the tag read event can be an occurrence that has significance to a business, warehouse, facility, user, entity, etc. The tag read event can be related to the process of retrieving data that is stored in the tag 110. The tag read process can involve sending radio waves to the tag and converting the waves that the tag returns back into data. By employing asynchronous event processing, the mixed mode component 102 allows the RFID process 104 to continuously and seamlessly receive data from the device 108 without constantly polling the device 108 to send such data. Thus, the RFID process 104 receives data from the device 108 (e.g., continuously, batch form, etc.) without limiting processing to poll the device 108.

It is to be appreciated that the RFID process 104 can utilize any suitable number of devices 108. An RFID process 104 can be related to a particular RFID sub-system (e.g., an RFID server, RFID network, etc.) that is an uber or high-level object that forms together various entities to create a meaningful unit of execution. The RFID process 104 can be and/or can include an outbound process (e.g., pick, pack, shipping scenario, etc.), a manufacturing process, a shipping process, a receiving process, tracking, data representation, data manipulation, data application, security, etc. Additionally, the RFID process 104 can include and/or respond to a device service, a tag read, an event, a tag write, a device configuration, a geographic tracking, a number count, etc. It is to be appreciated that the RFID process 104 can have raw data collected via at least one device, wherein such raw data can be manipulated based at least in part upon a rule and/or a business rule engine (not shown). The RFID process 104 can take a tag read event from the device 108 and make the tag read event available for at least one high level application.

For instance, the RFID process 104 can be a shipping process that represents multiple devices at various dock doors working together to perform tag reads, filtering, read enrichment, alert evaluation, and data storage in a sink for a host application to retrieve/process. In another example, the process can execute a manufacturing process, wherein devices are configured to read as well as write dependent upon a location. Moreover, additional functions such as filtering, alerting, enriching, etc. can be implemented at the location. In yet another example, the RFID process 104 can write to a tag process, wherein a tag can be written in real-time based at least upon an input. The write process can also check if the write succeeded by reading and passing data back to the host.

It is to be appreciated that the device 108 can receive a signal from, for instance, at least one tag 110 and/or a plurality of tags. In one example, the tag 110 can contain an antenna that provides reception and/or transmission to radio frequency queries from the device 108. Furthermore, it is to be appreciated that the device 108 within the RFID network (not shown) can be, but is not limited to being, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system. Additionally, although a single device 108 and tag 110 are depicted, it is to be appreciated that a plurality of devices 108 and tags 110 can be utilized with the system 100.

Moreover, the system 100 can include any suitable and/or necessary interface component 106 (herein referred to as "interface 106"), which provides various adapters, connectors, channels, communication paths, etc. to integrate the mixed mode component 102 into virtually any operating and/or database system(s). In addition, the interface 106 can provide various adapters, connectors, channels, communication paths, etc., that provide for interaction with the mixed mode component 102, the RFID network 104, and any other device and/or component associated with the system 100.

Figure 2:
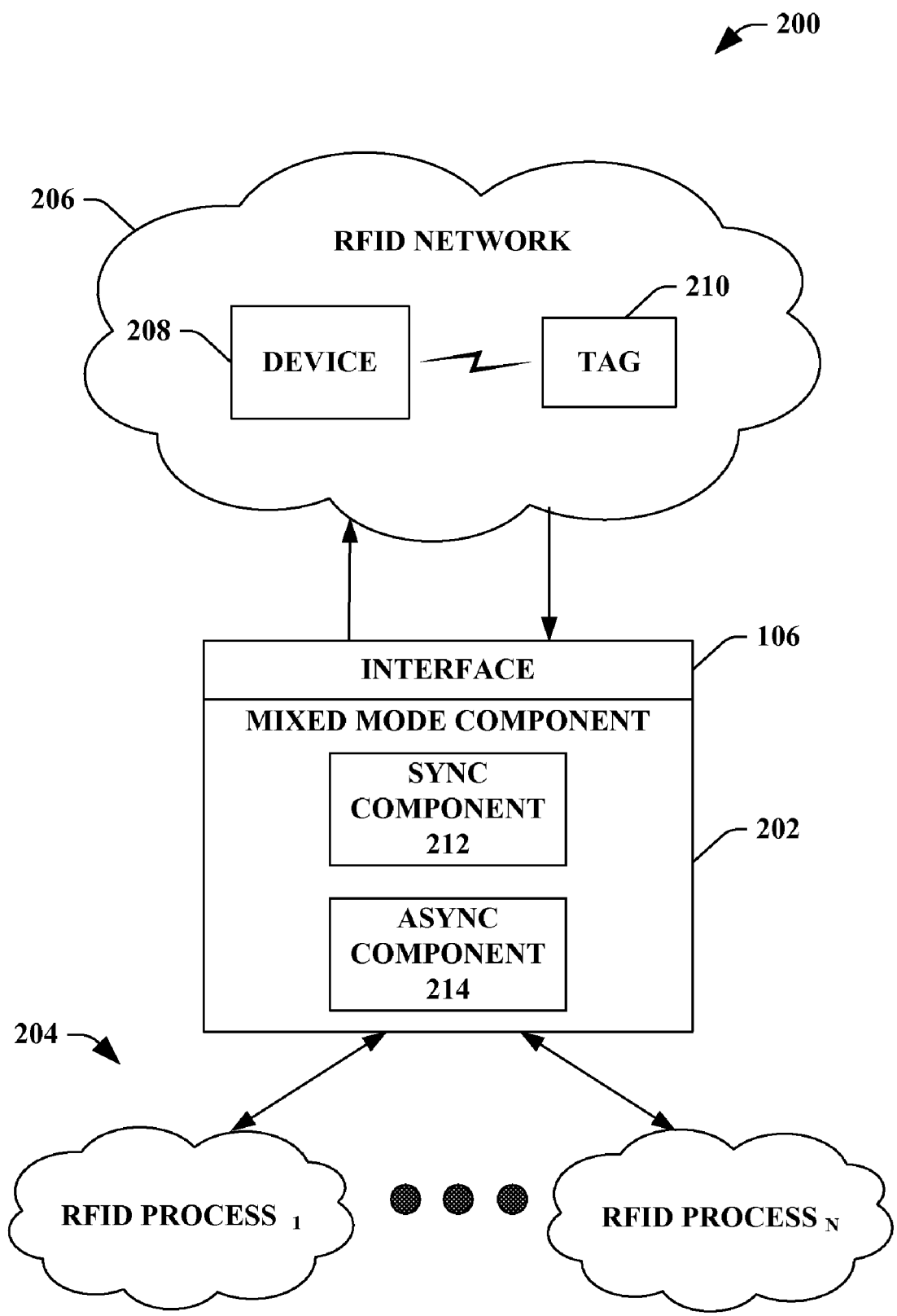
FIG. 2 illustrates a block diagram of an exemplary system that facilitates utilizing at least one of a synchronous command and an asynchronous event processing in relation to an RFID network and an RFID process.

FIG. 2 illustrates a system 200 that facilitates utilizing at least one of a synchronous command and an asynchronous event processing in relation to an RFID network and an RFID process. The system 200 can include a mixed mode component 202 that can simultaneously provide synchronous commands and asynchronous processing for a device 208 within an RFID network 206 that communicates wirelessly with a tag 210. The mixed mode component 202 can include an async component 214 that can utilize asynchronous event processing for at least one RFID process 204 to optimize system resources. It is to be appreciated that there can be any number of RFID processes 204 such as RFID process$_1$ to RFID process$_N$, where N is a positive integer. The asynchronous event processing can be intended for scenarios where user code can be executed on the delivery of an event. For instance, actions such as filtering, aggregating, transforming, and alerting can be business logic executing on receiving an event. Furthermore, the mixed mode component 202 can include a sync component 212 that can issue synchronous commands to the device 208, wherein upon receipt of a synchronous command, the device responds immediately to such request. It is to be appreciated that the mixed mode component 202 can employ asynchronous event processing and synchronous commands simultaneously for the device 208 by utilizing the sync component 212 and the async component 214.

For example, the RFID process 204 can asynchronously receive data from the device 208 in a batch form. In other words, the RFID process 204 can continuously receive data (e.g. events, reads, tag reads, tag read events, etc.) from the device 208 without polling the device 208 for such data. Continuing with this example, the device can be asynchronously transmitting data to the RFID process 204 while a synchronous command can be initiated. The synchronous command can be executed by a portable device (e.g., a handheld, a portable digital assistant (PDA), etc.) to provide, for instance, print tag, decommission tag, read tag, write tag, add read filter, and remove read filter.

It is to be appreciated that the system 200 can utilize a programming model for interacting with the device 208 with the following capabilities: 1) hardware agnostic; 2) physical connection agnostic; 3) multi-command exclusive access; and 4) administration channel capability. To implement hardware agnostic capabilities, the programming model can abstract out a hardware characteristic of the device 208 such that no code changes are required to retarget an application to use a disparate physical device 108. Thus, code can be written once and work on any device. For physical connection agnostic capabilities, the application can establish a "virtual connection" to the device 208, wherein the RFID infrastructure can manage the setup and teardown of the physical connections. This includes supplying a connection (e.g. TCP, HTML, etc.), style connection information, any physical authentication information, per-device connection state, etc. The independence from physical connections also allows simultaneous execution of the synchronous commands and receipt of asynchronous notifications from the device 208. In other words, the uniform programming model can be device agnostic for hardware to execute synchronous commands and physical connection agnostic to allow an application to receive asynchronous notifications from a device while a synchronous command is performed on the device. Moreover, the uniform programming model can abstract the fact that one physical connection can be re-used for multiple exclusive logical connections (e.g. an asynchronous listener versus a synchronous application).

To provide multi-command exclusive access capabilities, the "DeviceConnection" concept allows an application to take exclusive access over the device 208. This can be useful in scenarios such as tag printing, where the user can setup a template (e.g. one command), print a set of tags (e.g., multiple commands), and cleanup the template (e.g., another command). By providing exclusive access to the application, this scenario can be handled without worry of interleaving requests from multiple applications. By providing exclusive access to the application, interleaving requests from multiple applications can be handled in a way that guarantees atomicity of operations (e.g., exclusive connection access). To provide administrative channel capabilities, an administrator may not be locked out from controlling the device 208. The "DeviceConnection" abstraction can support multiple administration channels that can be simultaneously open, while still restricting normal applications to a single synchronous command channel at one time. The following pseudo code can be utilized to implement "DeviceConnection," and it is to be appreciated that such code is an example and is not to be limiting on the subject innovation:

```
using (DeviceConnection connection =
    new DeviceConnection(deviceName))
{
    //identify the tag fields of interest
    TagDataSelector selector = new TagDataSelector( );
    selector.IsId = true;
    selector.IsSource = true;
    selector.IsTime = true;
    //now get the tags
    connection.Open( );
    currentTags = connection.GetTags(selector);
    connection.Close( );
}
```

The RFID network 206 can be implemented by any enterprise, business, facility, and/or any suitable entity that can utilize RFID technology. For instance, the RFID network 206 can be deployed to include any number of devices 208 such as device$_1$ to device$_M$, where M is positive integer. Moreover, such devices 208 can interact (e.g., wirelessly communicate) with any number of tags 210 such as tag$_1$ to tag$_P$, where P is a positive integer. It is to be appreciated that the devices 208 can be at least one of the following: an RFID reader, an RFID writer, an RFID printer, an RFID transmitter, a sensor, a real-time device, an RFID receiver, a real-time sensor, a device extensible to a web service, a real-time event generator, etc. In addition, the device 208 can be associated with at least an antenna to communicate data. Furthermore, it is to be appreciated that the tags 210 can be associated to any suitable object related to the enterprise, business, facility, and/or any suitable entity utilizing such RFID technology.

The devices 206 can be associated with at least one RFID process 204. It is to be appreciated that the RFID process 204 can run in the same host as the distribute component 202. The RFID network 206 can include various sub-systems and/or groups based at least in part upon device location, device functionality, device security level, process device association, make and/or model of device, type of device, device frequency, etc. For example, an RFID network 204 can include two groups and/or collections of devices, one at a shipping door and another at a receiving door. Such RFID network 206 can further include a process associated with each groups and/or collection of devices. For instance, the process can be a shipping process that is related to the devices at the shipping door, wherein the devices can collect data at such location. Similarly, another process can be a receiving process that is related to the devices at the receiving door, wherein the devices can collect data at such location.

Furthermore, the RFID process 204 can be a business process, wherein the devices 206 can be indirectly utilized in association with the business process (not shown). In an example, an RFID stack can bridge the gap between devices 208 and business applications. The business process can be, for instance, a business application to achieve a critical business function. For instance, the business application can be a back end application, an existing business application, a line of business (LOB) application, an accounting application, a supply chain management application, a resource planning application, and/or a business monitoring (BAM) application. In addition, the critical business function can be, for example, a demand plan, a forecast, and/or an inventory control with the incorporation of RFID data in real-time. In another example, an RFID host associated with the RFID network 206 can utilize a business rules engine (not shown), wherein such business rules engine can provide a rule-based system in association with any application related to the RFID network 206 such that a filter and/or alert can be utilized as a rule(s). The business rules engine can execute declarative filters and/or alerts as rules associated with an RFID network 206, wherein the rules can include a rule set adhered to an event, condition, and action format utilizing an extensible markup language (XML). The rule is at least one of the following: contained within a rule set that adheres to an event, a condition, and an action; and represented utilizing an extensible markup language (XML). Moreover, the condition has at least one of a set of predicates and a logical connective to form a logical expression that evaluates to one of a true and a false.

The process can be an uber and/or high-level object that can provide a meaningful unit of execution. For instance, the process can be a shipping process that represents multiple devices at various dock doors working together to perform tag reads, filtering, read enrichment, alert evaluation, and data storage in a sink for a host application to retrieve/process. In another example, the process can execute a manufacturing process, wherein devices are configured to read as well as write dependent upon a location. Moreover, additional functions such as filtering, alerting, enriching, etc. can be implemented at the location. In yet another example, the process can write to a tag process, wherein a tag can be written in real-time based at least upon an input. The write process can also check if the write succeeded by reading and passing data back to the host.

Figure 3:
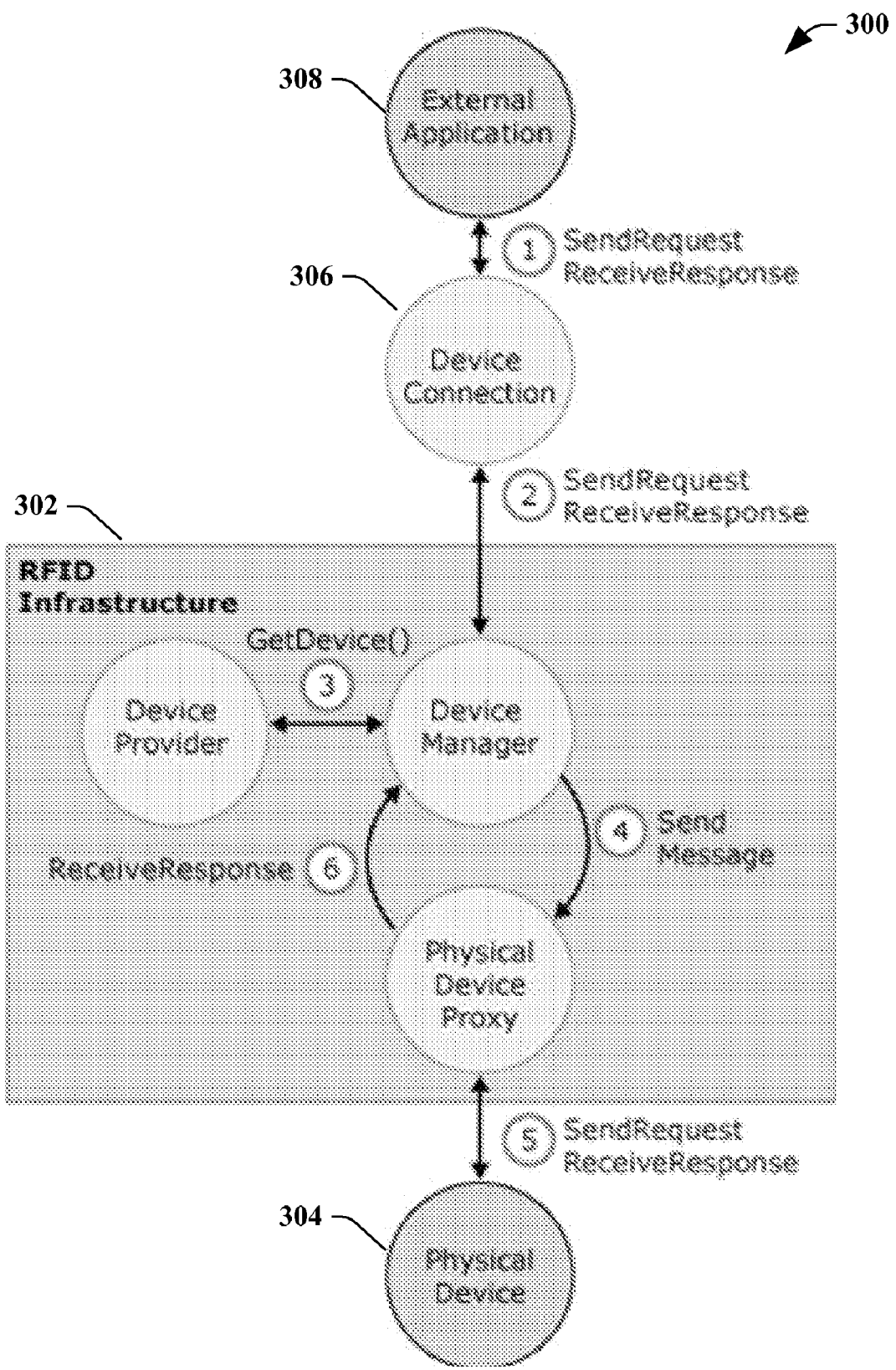
FIG. 3 illustrates a block diagram of an exemplary system that facilitates employing a synchronous command within an RFID infrastructure.

FIG. 3 illustrates a system 300 that facilitates employing a synchronous command within an RFID infrastructure. The system 300 can include an RFID infrastructure 302 that can utilize a synchronous command model. The Client application can make use of the Synchronous Command Model via the DeviceConnection class that exposes various methods to get/set information from a physical device 304. The DeviceConnection class can be designed to be loaded into the same application domain as the Client application. The basic sequence for executing synchronous commands involves, opening the connection, executing commands and closing the connection.

The following is an exemplary synchronous command model control flow:

1. The device connection represents a "client connection" (referred to as a device connection 306) to the device 304 and does not imply that a physical connection exists between the client application (referred also to as an external application 308) and the device directly. The device connection object communicates with RFID Infrastructure 302, which through the device service provider interface (DSPI), establishes physical connections to the device 304 internally by using the transport that is defined for the device 304. The actual transport is abstracted from the client application 308.
2. At any time only one connection to a device 304 can be open. If two applications try to open a connection concurrently, the second attempt can fail and the RFID Infrastructure 302 raises an exception. The RFID Infrastructure 302 can provide this feature to ensure exclusive access to the client application 308 that is currently using the device 304, thus preserving the integrity of the application. Otherwise, for example, if there are two client applications, CommisionTagsApp and DecommissionTagsApp, both operating on the same device 304, interleaved command execution for these applications could result in undefined behavior. It is to be appreciated that the above restriction only applies to applications using device connections. An administrator can open any number of administration connections to a device 304 at one time. However, the administrator can be judicious in choosing the operations to perform and the effect that the operations could have on applications that are currently connected to the device 304.
3. The connection-oriented nature of the synchronous command model requires application developers to close device connections after using them, much in the substantially similar way that database connections can be closed after usage. If an application developer forgets to close a connection and exits the connection, the device will be unusable until the application developer closes the connection using the KillConnection method in the DeviceManagerProxy class. The RFID Manager and rfidclientconsole support KillConnection as an administrative operation.
4. The KillConnection( ) method may not affect the notification channel. After a connection is closed, applications 308 can open connections to the device 304. If a connection to a device 304 is open, the following may not be implemented: change the device 304, rename the device 304, or delete the device 304 from RFID Infrastructure 302 until you close the connection.
5. DeviceStatus returns a collection of GUIDs that represent open connection IDs. Note that a maximum of one GUID can correspond to a user connection. The other GUIDs can correspond to administrative connections.

Figure 4:
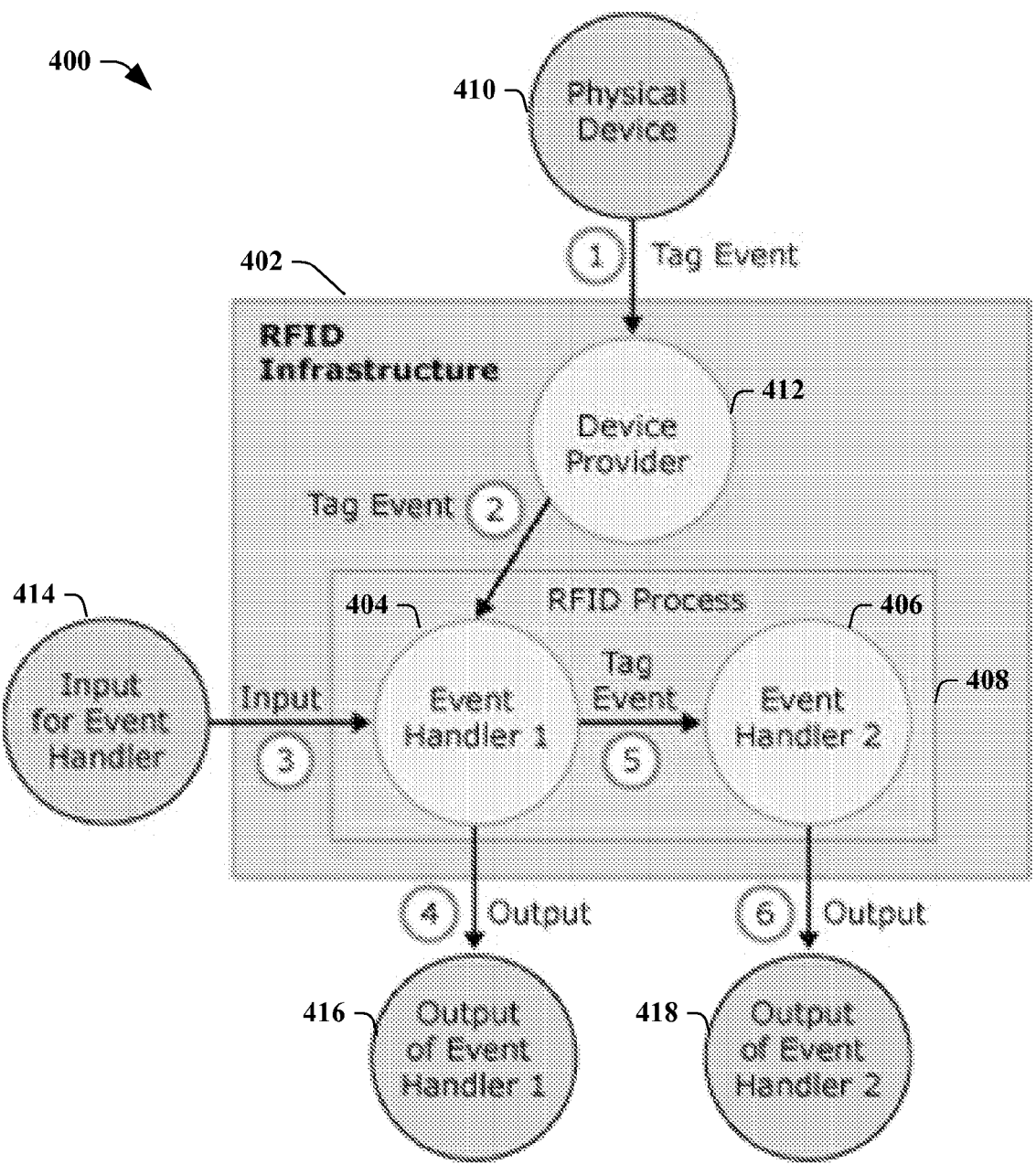
FIG. 4 illustrates a block diagram of an exemplary system that facilitates utilizing an asynchronous event processing within an RFID infrastructure.

FIG. 4 illustrates a system 400 that facilitates utilizing an asynchronous event processing within an RFID infrastructure. The system 400 can include an RFID infrastructure 402 that can utilize an asynchronous event processing model. To leverage the asynchronous event processing model, the RFID application developer develops at least one event handler 404 (also depicted is a disparate event handler 406), or use pre-existing event handlers such as the SqlServerSink event handler. It is to be appreciated that the event handler can be managed code running in the context of an RFID process 408 that processes a tag event. The application developer can add these event handlers as components to the RFID process 408. The "event processing pipeline" can define the order in which the event handlers act on an asynchronous event.

The following is an exemplary asynchronous event processing model control flow:

1. A physical device 410 raises tag events to RFID Infrastructure 402 via a device provider 412.
2. The RFID Infrastructure 402 can route these events to the RFID processes (such as RFID process 408) that are interested in the event by consulting the binding information for the process and then adding the events to the inbound queue for the process. The RFID process 408 can manage the queue associated therewith automatically. The queue can be created when the process is created and can be deleted when the process is deleted.
3. The process 408 picks up queued events and delivers them to the component pipelines for processing. When the pipeline picks up an event, the first event handler 404 in the pipeline receives the tag events for processing (illustrated as input for event handler 414).

4. The first event handler 404 can process events and not send them to the second event handler. This can be referred to as "filtering". The first event handler 404, in such cases, can send an output 416 to an external receiver such as a database.
5. The first event handler 404 can pass on the event to the second event handler 406 for further processing. The first event handler 404 can also pass on multiple events to the next event handler.
6. On receiving an event, the second event handler 406 can choose to filter the event, send it to an external receiver 418, or generate more events that can be passed on to the event handlers downstream.

Figure 5:
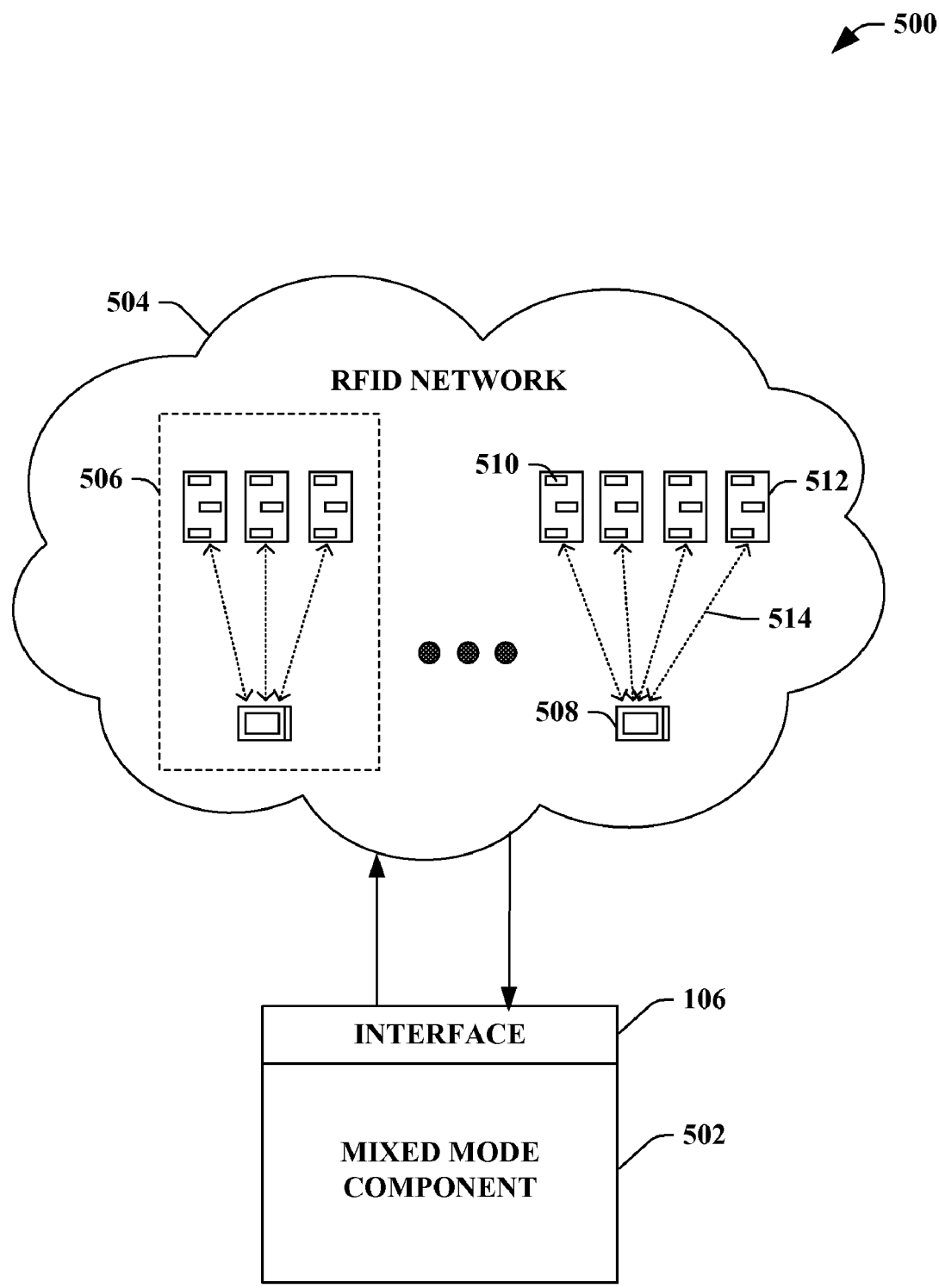
FIG. 5 illustrates a block diagram of an exemplary system that facilitates providing instructions to a device within an RFID network in a synchronous and an asynchronous manner.

FIG. 5 illustrates a system 500 that facilitates providing instructions to a device within an RFID network in a synchronous and an asynchronous manner. The system 500 can include a mixed mode component 502 that can implement a synchronous command and an asynchronous notification in connection with a device 508. The mixed mode component 502 allows a synchronous command model and an asynchronous event processing model to be employed in connection with the device 508 and an application (not shown), an RFID process (not shown), an RFID business process (not shown), etc. It is to be appreciated that the mixed mode component 102 can employ a synchronous mode, an asynchronous mode, and/or any combination thereof simultaneously. It is to be appreciated that the mixed mode component 502 can be substantially similar to the mixed mode component 202, and 102 of FIG. 2, and FIG. 1 respectively.

The RFID network 504 can include a plurality of universes (e.g., sub-systems, RFID networks), wherein a universe is a server of RFID entities. For simplicity, the RFID network 504 illustrates a single universe containing two collections of devices (e.g. device collections), where a first collection 506 is shown. It is to be appreciated that the device collections can correspond to device groups, wherein such collections and/or groups can be based on at least one of the following: device physical location, device functionality, device security level, process device association, make and/or model of device, type of device, device frequency, etc. For instance, an RFID sub-system can be a location wherein the entities involved are related to a substantially similar process. In one example, a sub-system can be a warehouse containing a plurality of receiving and/or shipping dock doors with associated devices. Thus, first collection 506 can be a collection of devices within the specified sub-system. It is to be appreciated a plurality of collection of devices can be implemented. Within a collection of devices, a device 508 can receive an RFID signal 514 from a pallet of goods 512 containing at least one RFID tag 510. It is to be appreciated the pallets and/or goods can be tagged based at least upon user specifications (e.g. single pallets tagged, individual goods tagged, pallets and goods tagged, etc.).

Figure 6:
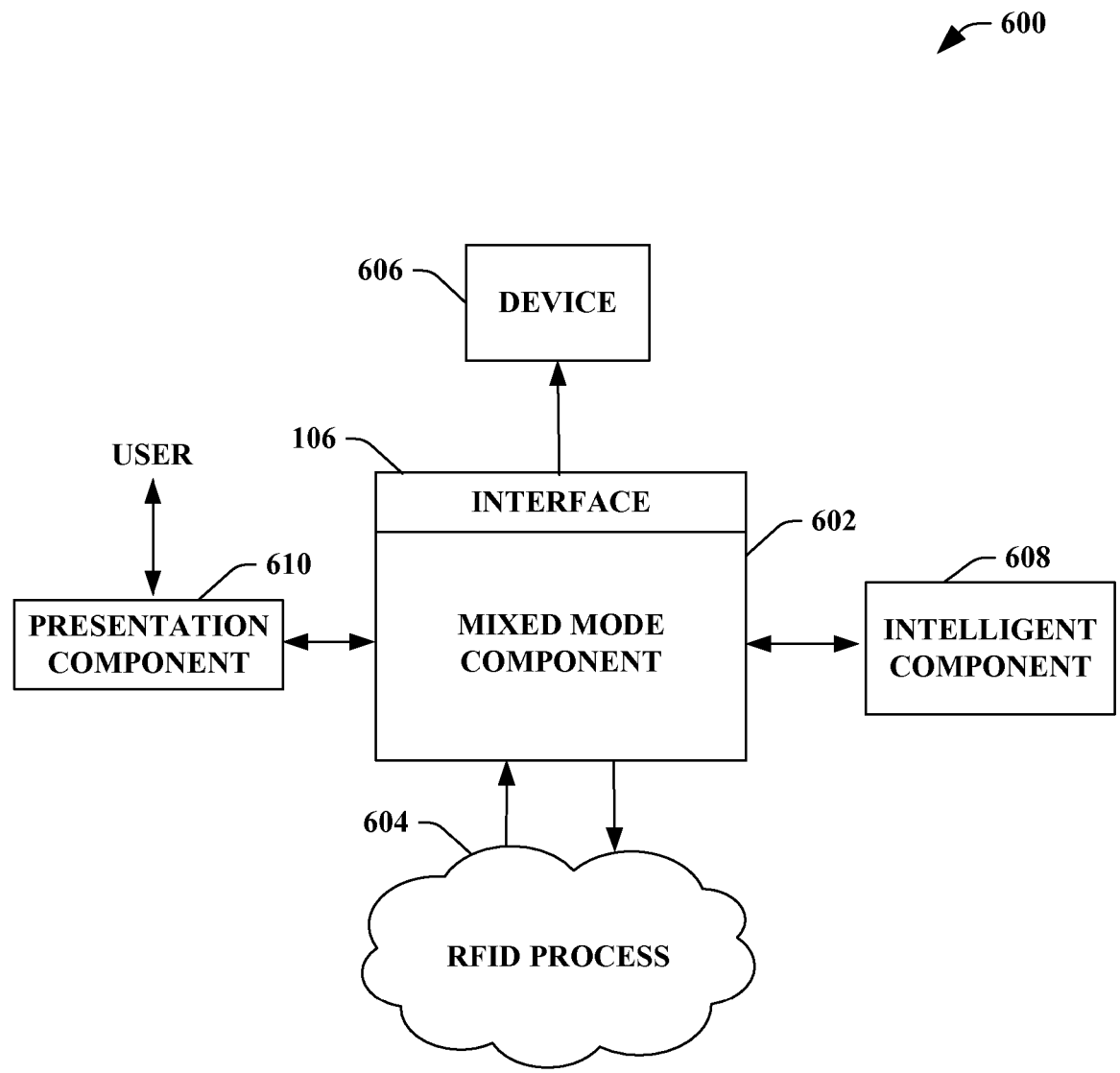
FIG. 6 illustrates a block diagram of an exemplary system that facilitates employing a synchronous mode and an asynchronous mode in relation to an application and event processing within an RFID infrastructure.

FIG. 6 illustrates a system 600 that employs intelligence to facilitate employing a synchronous mode and an asynchronous mode in relation to an application and event processing within an RFID infrastructure. The system 600 can include a mixed mode component 602, an RFID process 604, a device 606, and the interface 106 that can all be substantially similar to respective components, processes, and interfaces described in previous figures. The system 600 further includes an intelligent component 608. The intelligent component 608 can be utilized by the mixed mode component 602 to facilitate allowing a synchronous command model and an asynchronous event processing model to be employed in connection with the device 606 and an application (not shown), the RFID process 604, an RFID business process (not shown), etc. For example, the intelligent component 608 can infer synchronous commands, asynchronous notifications, simultaneously implementing synchronous commands and asynchronous notifications, exclusive access, administrative channel capabilities, channel abandonment, communication status, etc.

It is to be understood that the intelligent component 608 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The mixed mode component 602 can further utilize a presentation component 610 that provides various types of user interfaces to facilitate interaction between a user and any component coupled to the mixed mode component 602. As depicted, the presentation component 610 is a separate entity that can be utilized with the mixed mode component 602. However, it is to be appreciated that the presentation component 610 and/or similar view components can be incorporated into the mixed mode component 602 and/or a stand-alone unit. The presentation component 610 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the mixed mode component 602.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
FIG. 7 illustrates an exemplary user interface that facilitates initiating a synchronous command to a device within an RFID network.

FIG. 7 illustrates a user interface 700 that facilitates initiating a synchronous command to a device within an RFID network. The user interface 700 can provide various synchronous command dialog boxes to obtain inputs from an external application. The inputs can be, for instance, TagId, New Kill Code, New Access Code, etc. After the RFID infrastructure discovers at least one available device, the external application can launch the user interface 700. It is to be appreciated that the user interface 700 is solely for example, and the claimed subject matter is not so limited. Furthermore, the following table lists options associated with the user interface 700:

| Use this | To do this |
| --- | --- |
| Pick a Device drop-down list | Select a device from the list that display the available devices. |
| Tag ID field | Type the tag ID, for example, a 96 bit EPC ID, in Hex encoding. |
| New Access Code field | Type the Byte code to provide access permissions on the tag, in Hex encoding. |
| New Kill Code field | Type the Byte code to provide kill permissions on the tag, in Hex encoding. |
| Print Tag button | Click to print the tag. |
| Clear button | Click to clear the data that you entered in the fields. |
| Exit button | Click to exit the Synchronous Command dialog box. |

Figure 8:
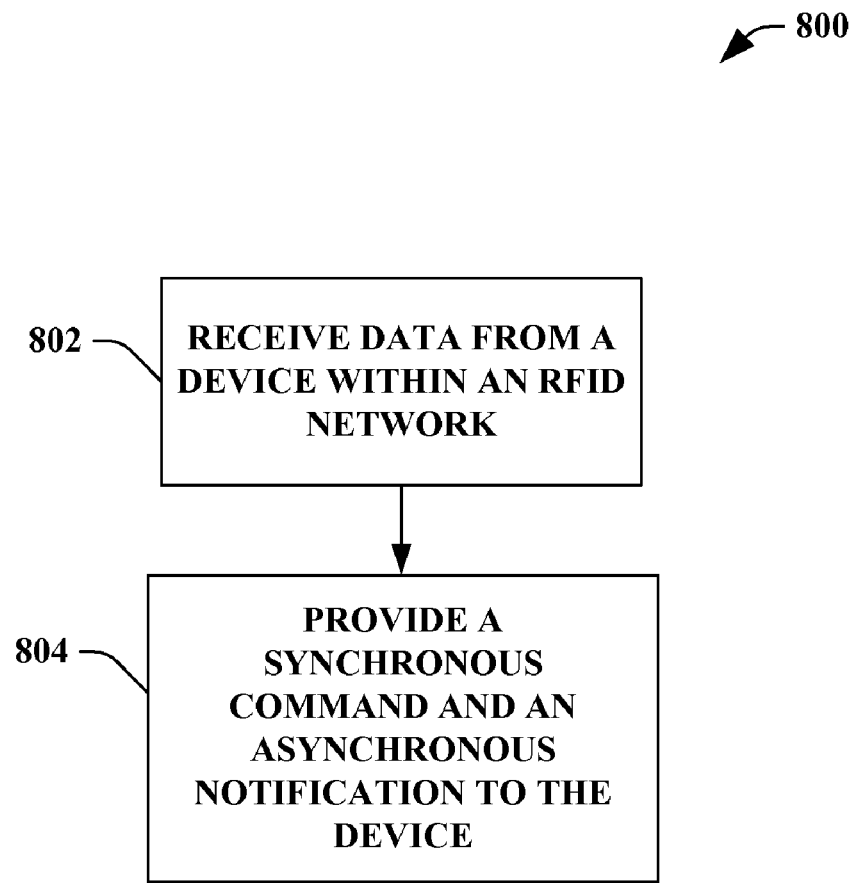
FIG. 8 illustrates an exemplary methodology for employing a synchronous mode and an asynchronous mode in relation to an application and event processing within an RFID infrastructure.
Figure 9:
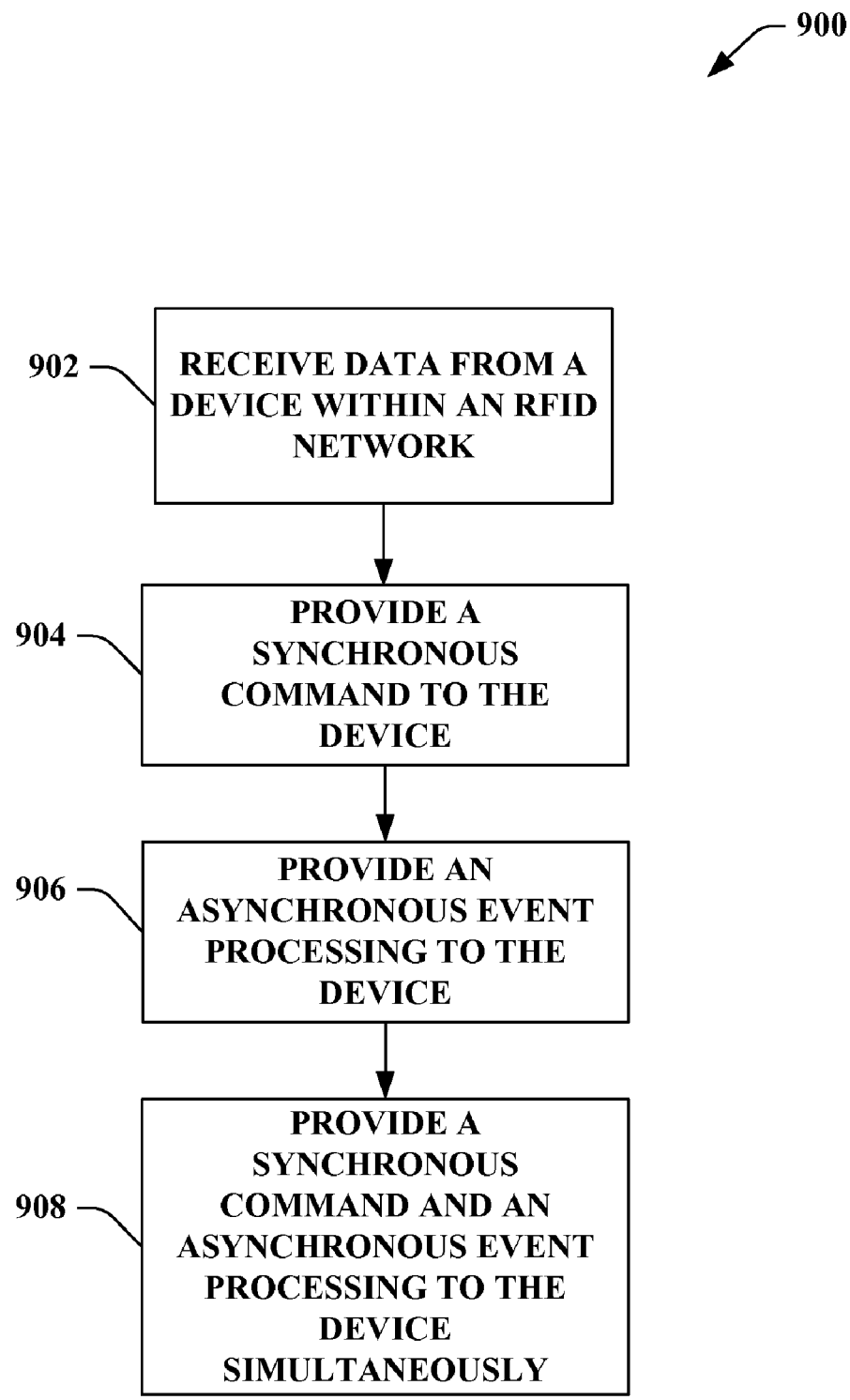
FIG. 9 illustrates an exemplary methodology that facilitates utilizing at least one of a synchronous command and an asynchronous event processing in relation to an RFID network and an RFID process.
Figure 10:
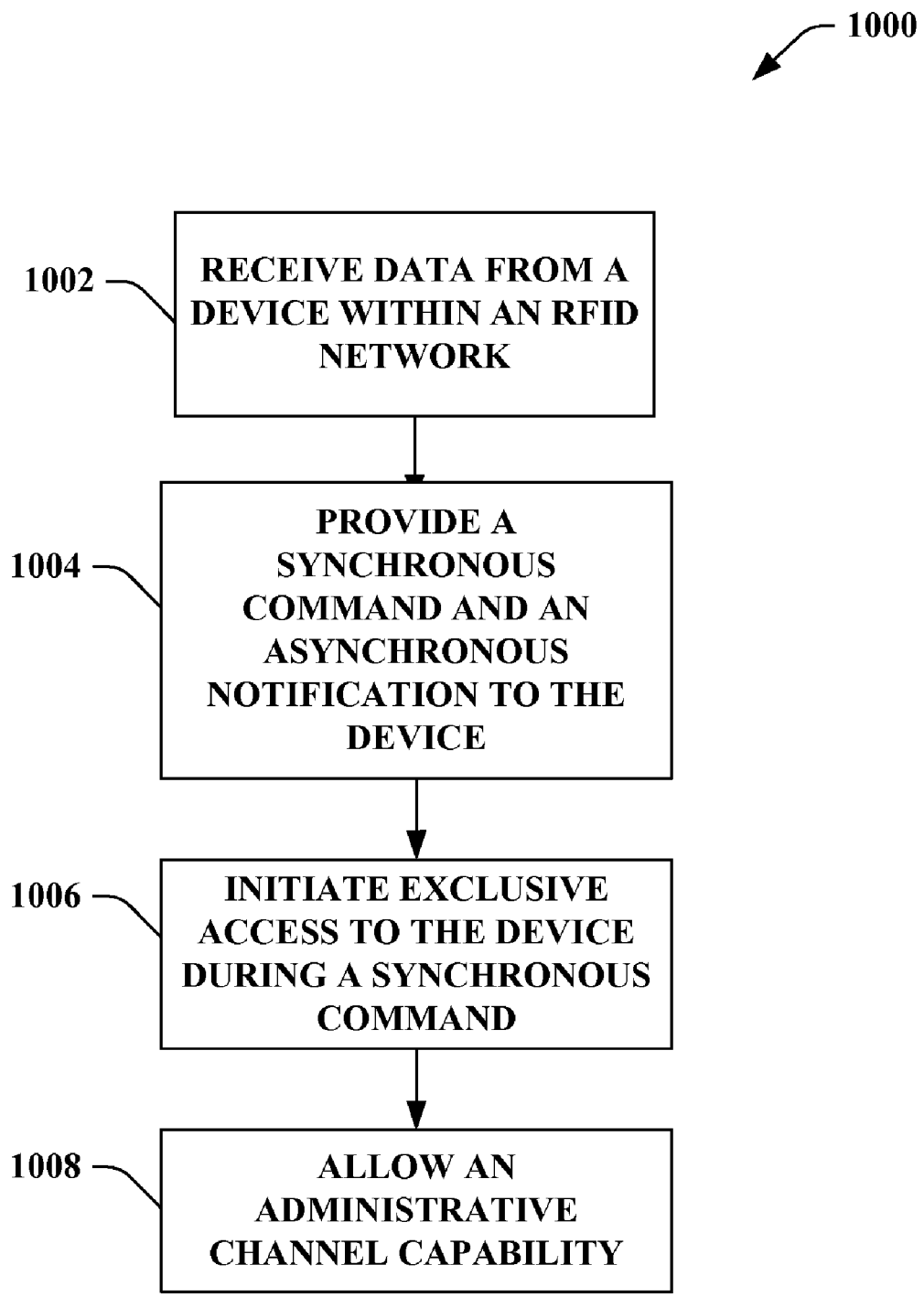
FIG. 10 illustrates an exemplary methodology for providing instructions to a device within an RFID network in a synchronous and an asynchronous manner.

FIGS. 8-10 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 illustrates a methodology 800 that facilitates employing a synchronous mode and an asynchronous mode in relation to an application and event processing within an RFID infrastructure. At reference numeral 802, data can be received from a device within an RFID network. The device can receive a signal from, for instance, at least one tag and/or a plurality of tags. In one example, the tag can contain an antenna that provides reception and/or transmission to radio frequency queries from the device. Furthermore, it is to be appreciated that the device within the RFID network can be, but is not limited to being, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system.

The RFID network can include at least one device that is associated with at least one RFID process. It is to be appreciated that the RFID process can utilize any suitable number of devices within the RFID network. An RFID process can be related to a particular RFID sub-system (e.g., an RFID server, RFID network, etc.) that is an uber or high-level object that forms together various entities to create a meaningful unit of execution. The RFID process can be an outbound process (e.g., pick, pack, shipping scenario, etc.), a manufacturing process, a shipping process, a receiving process, tracking, data representation, data manipulation, data application, security, etc.

At reference numeral 804, a synchronous command and an asynchronous notification can be provided to the device within the RFID network. The synchronous command can follow a request-response pattern. An application, process, etc. can issue a specific request to the device by utilizing the RFID infrastructure and receive a message after the request is completed. For instance, the following synchronous commands can be implemented: print tag, decommission tag, read tag, write tag, add read filter, and remove read filter. When utilizing the synchronous commands, such requests can be sent to the device immediately, wherein the application can wait for a response to ensure the request is serviced and/or completed.

The asynchronous notification allows for the receipt of data without the device being polled. The RFID process can continuously receive a tag read event based on declared interest for such events during device binding. For instance, the tag read event can be an occurrence that has significance to a business, warehouse, facility, user, entity, etc. By employing asynchronous event processing, the RFID process can continuously and seamlessly receive data from the device without constantly polling the device to send such data. Moreover, it is to be appreciated that the synchronous command and the asynchronous notification can be initiated simultaneously to the same device within the network.

FIG. 9 illustrates a methodology 900 for utilizing at least one of a synchronous command and an asynchronous event processing in relation to an RFID network and an RFID process. At reference numeral 902, data can be received from a device within an RFID network. It is to be appreciated that the data can be communicated from a tag to a device that can be at least one of the following: an RFID reader, an RFID writer, an RFID printer, a printer, a reader, a writer, an RFID transmitter, an antenna, a sensor, a real-time device, an RFID receiver, a real-time sensor, a device extensible to a web service, a real-time event generation, etc. The RFID network can be implemented by any enterprise, business, facility, and/or any suitable entity that can utilize RFID technology. For instance, the RFID network can be deployed to include any number of devices such as $device_1$ to $device_N$, where N is positive integer. Moreover, such devices can interact (e.g., wirelessly communicate) with any number of tags such as $tag_1$ to $tag_M$, where M is a positive integer.

At reference numeral 904, a synchronous command can be executed on the device. The synchronous command can open a communication channel to the device, wherein a particular request and response is transmitted. The synchronous command can imply immediate response by the device such that a particular application, process, etc. is requesting such data. At reference numeral 906, an asynchronous event processing can be initiated on the device within the RFID network. In particular, an RFID process can receive data from a device on a channel for communication without continuously polling such device to transmit such data. At reference numeral 908, a synchronous command and an asynchronous event processing to the same device simultaneously. Thus, the device can utilize an asynchronous channel to continuously communicate data to an RFID process while executing a synchronous command in a disparate communication channel.

FIG. 10 illustrates a methodology that facilitates providing instructions to a device within an RFID network in a synchronous and an asynchronous manner. At reference numeral 1002, data can be received from a device within an RFID network. The data can be wirelessly communicated from a tag to the device, wherein the device can be, but is not limited to, an RFID reader, an RFID writer, an RFID printer, a printer, a reader, a writer, an RFID transmitter, an antenna, a sensor, a real-time device, an RFID receiver, a real-time sensor, a device extensible to a web service, a real-time event generation, etc.

At reference numeral 1004, a synchronous command and an asynchronous notification can be utilized with the device within the RFID network. The synchronous command can be executed by an application such that the device can receive a request via a communication channel and then immediately respond accordingly via the communication channel. Moreover, the communication channel can be opened for the request-response and then closed upon the transmission of the response. The asynchronous notification can allow an RFID process to receive data from the device without a continuously polling for such data request.

At reference numeral 1006, exclusive access to the device can be initiated during a synchronous command. Thus, the device can be accessed by one application at a time during a synchronous command so that there are no complications associated with interleaving requests from multiple applications. By providing exclusive access to the application, interleaving requests from multiple applications can be handled in a way that guarantees atomicity of operations (e.g. exclusive connection access). At reference numeral 1008, administrative channel capabilities can be allowed. Exclusive access to the device does not mean that administrators are locked out from controlling the device. There can be multiple administrative channels supported that can be simultaneously open while still restricting normal applications to a single synchronous command channel at a time.

Figure 11:
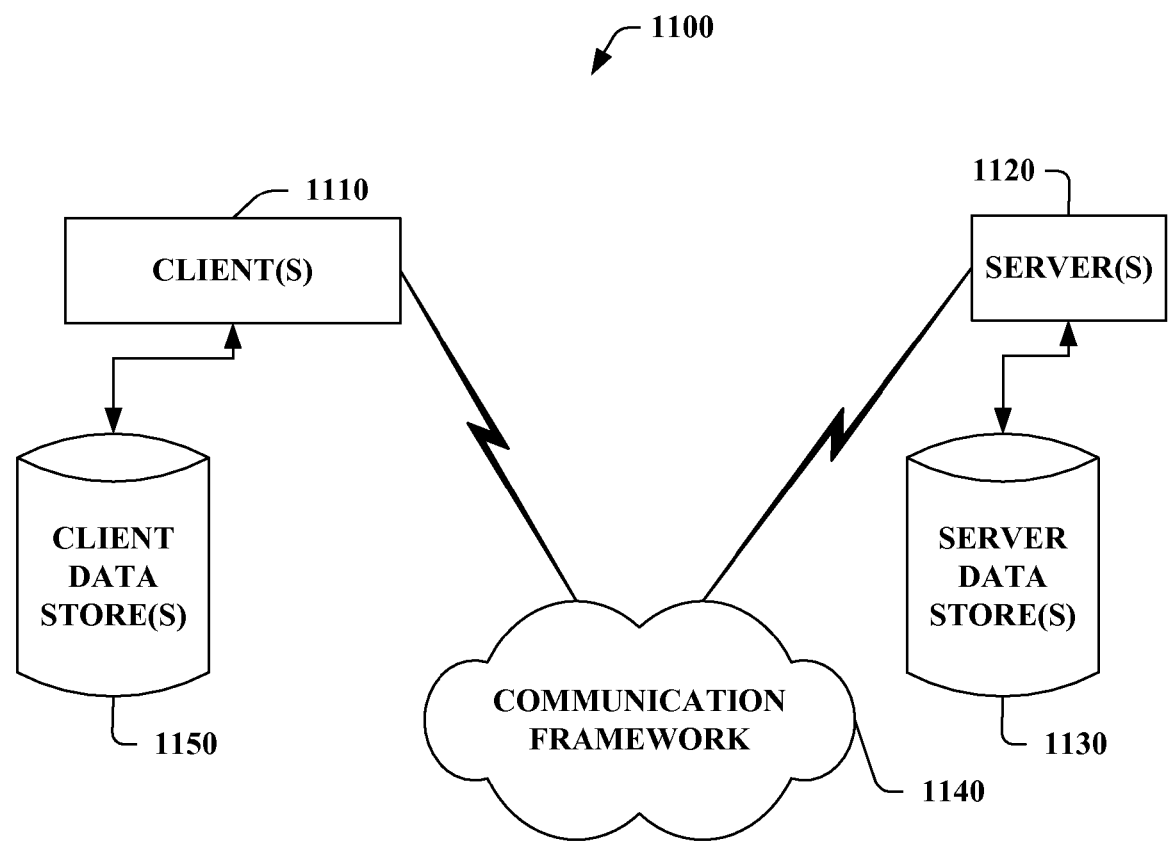
FIG. 11 illustrates an exemplary networking environment, wherein the novel aspects of the claimed subject matter can be employed.
Figure 12:
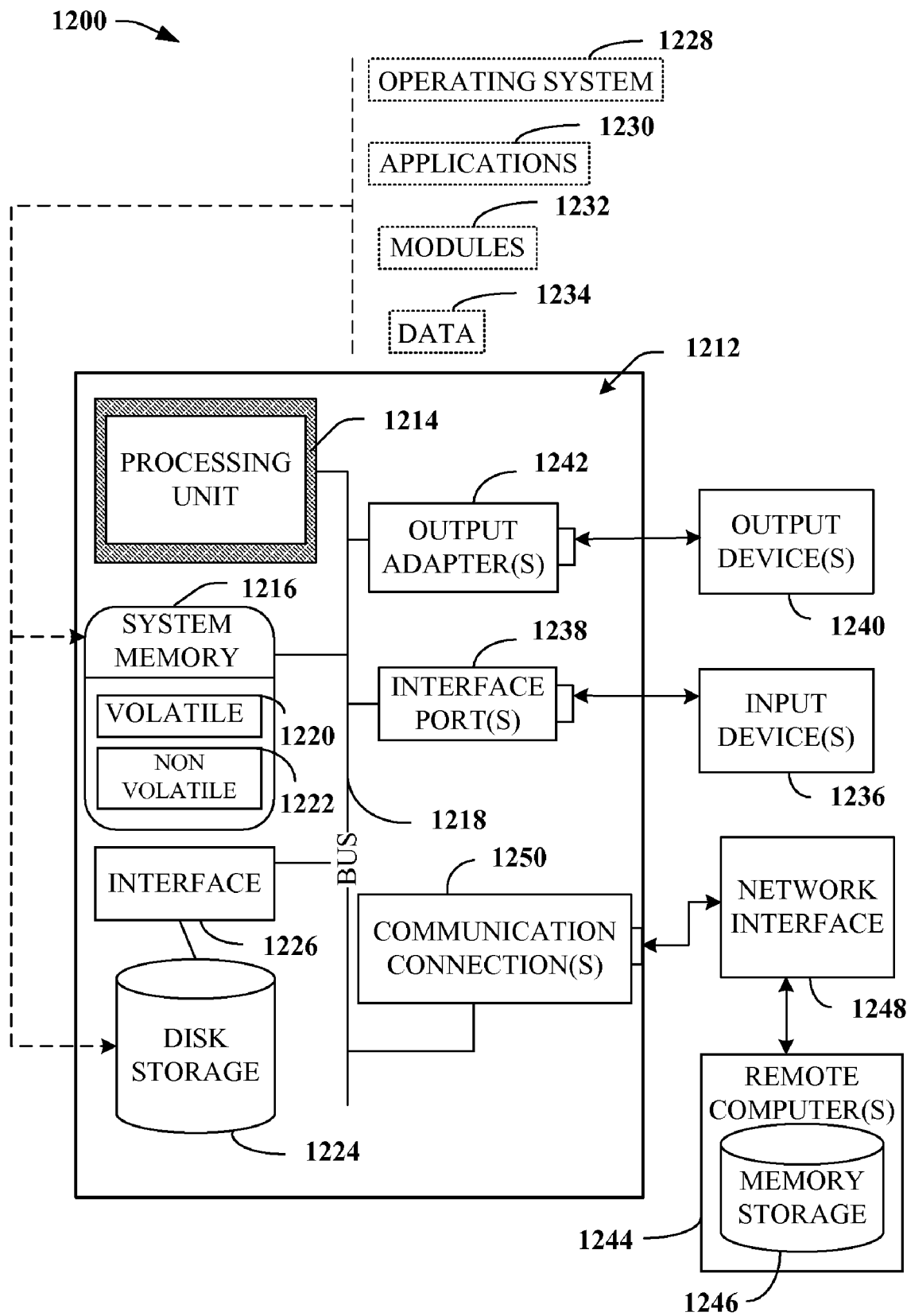
FIG. 12 illustrates an exemplary operating environment that can be employed in accordance with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. For example, a mixed mode component that employs asynchronous mode and a synchronous mode in association with an RFID process and an RFID network, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer-implemented system configured to provide communication channels within a radio frequency identification (RFID) infrastructure, the computer-implemented system comprising:
    a radio frequency identification (RFID) network that includes at least one device configured to receive data from a tag;
    a mixed mode component configured to concurrently execute a synchronous command and asynchronous event processing on the device;
    a processor; and
    a computer-readable storage medium storing instructions that, when executed by the processor, cause the processor to implement the mixed mode component.

2. The computer-implemented system of claim 1, further comprising an RFID process configured to receive, via at least one of the communication channels, data associated with the asynchronous event processing.

3. The computer-implemented system of claim 2, wherein the RFID process comprises an object configured to create a unit of execution that relates to at least one of the following: an outbound process; a manufacturing process; a shipping process; a receiving process; a tracking process; a data representation process; a data manipulation process; a security process; or a process utilizing at least one of: an RFID device service, a device collection, a tag read, an event, an event queue, a tag write, a device configuration or a number count.

4. The computer-implemented system of claim 2, further comprising an event handler associated with the RFID process.

5. The computer-implemented system of claim 4, wherein the event handler is managed code configured to execute in a context of the RFID process.

6. The computer-implemented system of claim 1, wherein the device comprises at least one of the following: an RFID reader; an RFID writer; an RFID printer; a reader; a writer; an RFID transmitter; an antenna; a sensor; a real-time device; an RFID receiver; a real-time sensor; a device extensible to a web service; or a real-time event generation system.

7. The computer-implemented system of claim 1, further comprising an application configured to utilize at least one of the communication channels, wherein the at least one of the communication channels is associated with the synchronous command.

8. The computer-implemented system of claim 1, wherein the synchronous command is at least one of: a print tag, a decommission tag, a read tag, a write tag, an add read filter or a remove read filter.

9. The computer-implemented system of claim 1, wherein the synchronous command is a request-response pattern.

10. The computer-implemented system of claim 1, wherein the asynchronous event processing is configured to enable an RFID process to receive data from the device without polling the device.

11. The computer-implemented system of claim 1, wherein the multi-mode component is further configured to initiate multi-command exclusive access to the device while the synchronous command is being executed.

12. The computer-implemented system of claim 11, further comprising an administrative channel configured to access the device so the device is not locked out from control, while the synchronous command is being executed.

13. The computer-implemented system of claim 12, wherein the administrative channel is configured to be open while an application without administrative access is restricted to a synchronous command channel.

14. The computer-implemented system of claim 1, further comprising a uniform programming model configured to be utilized by the mixed mode component,
    wherein the uniform programming model:
        is device agnostic to enable hardware to execute the synchronous command or
        is physical connection agnostic to enable an application to receive an asynchronous notification from the device while the synchronous command is executed on the device, and
    wherein the uniform programming model is configured to abstract at least one physical connection to re-use for one or more exclusive logical connections.

15. The computer-implemented system of claim 1, wherein the RFID network comprises a collection of devices that form a sub-system, wherein the sub-system comprises:
    an RFID reader configured to receive an RFID signal; and
    an RFID tag configured to transmit to at least one of the collection of devices.

16. A computer-implemented method that provides communication channels within a radio frequency identification (RFID) infrastructure, the computer-implemented method comprising:
    employing a processor to execute computer-executable instructions, that when executed by the processor, cause the processor to:
        receive data from a device within an RFID network; and
        simultaneously output, from a computer system to the device, a synchronous command and asynchronous event processing data, wherein the computer system is configured to perform the computer-implemented method.

17. The method of claim 16, wherein the processor initiates exclusive access to the device while the synchronous command is output.

18. The method of claim 17, wherein the processor generates an administrative channel configured to be open while the synchronous command is output.

19. A computer-implemented system configured to provide communication channels within a radio frequency identification (RFID) infrastructure, the computer-implemented system comprising:
    a device configured to receive data from a tag, the device being included within a radio frequency identification (RFID) network;
    a synchronous component configured to employ a synchronous command with the device;
    an asynchronous component configured to perform asynchronous event processing with the device;
    an administrative channel configured to access the device during a time period during which the synchronous command is employed, wherein the access enables control of the device during the time period;
    a processor; and
    a computer-readable storage medium storing instructions that, when executed by the processor, cause the processor to implement at least one of the synchronous component, the asynchronous component or the administrative channel.

* * * * *